United States Patent [19]
Eckel et al.

[11] Patent Number: 5,010,135
[45] Date of Patent: Apr. 23, 1991

[54] MOULDING COMPOUNDS OF AROMATIC POLYESTERS, VINYL COPOLYMERS AND GRAFTED SILICONE RUBBER

[75] Inventors: Thomas Eckel; Edgar Leitz, both of Dormagen; Dieter Wittmann, Krefeld; Karl-Heinz Ott; Horst Peters, both of Leverkusen; Jochen Schoeps, Krefeld, all of Fed. Rep. of Germany

[73] Assignee: Bayer Aktiengesellschaft, Leverkusen, Fed. Rep. of Germany

[21] Appl. No.: 547,384

[22] Filed: Jun. 29, 1990

Related U.S. Application Data

[63] Continuation of Ser. No. 292,915, Jan. 3, 1989, abandoned.

[30] Foreign Application Priority Data

Jan. 12, 1988 [DE] Fed. Rep. of Germany ....... 3800603

[51] Int. Cl.$^5$ .............................................. C08G 63/48
[52] U.S. Cl. ...................................... 525/63; 525/100; 525/106
[58] Field of Search .......................... 525/63, 100, 106

[56] References Cited

U.S. PATENT DOCUMENTS 4,582,876 4/1986 Weemes et al. ...................... 525/64
4,812,515 3/1989 Kress et al. ............................ 525/63

FOREIGN PATENT DOCUMENTS 0119311 9/1984 European Pat. Off. .
0214658 3/1987 European Pat. Off. .

*Primary Examiner*—Melvyn I. Marquis
*Attorney, Agent, or Firm*—Connolly and Hutz

[57] ABSTRACT

Moulding compounds of fully aromatic polyesters, vinyl copolymers and grafted silicone rubber of a specified composition may be worked up into moulded products with excellent low temperature toughness and surface quality and very high resistance to stress cracking.

9 Claims, No Drawings

MOULDING COMPOUNDS OF AROMATIC POLYESTERS, VINYL COPOLYMERS AND GRAFTED SILICONE RUBBER

This application is a continuation of application Ser. No. 292,915, filed Jan. 3, 1989 now abandoned.

This invention relates to thermoplastic moulding compounds of fully aromatic polyesters, vinyl copolymers and a grafted silicone rubber, to a process for their preparation by mixing the components together at an elevated temperature and to their use for the production of moulded articles, particularly by injection moulding.

The term "fully aromatic polyesters" in the context of this invention also includes fully aromatic polyester carbonates.

Moulding compounds based on fully aromatic polyesters are known. They may be modified to render them impact resistant by various additives, preferably polyolefines, diene and acrylate rubbers and styrene polymers (EP-A 0 119 311). Whereas diene rubbers are unsuitable for such moulding compounds for certain applications (outdoor use) on account of their well-known sensitivity to heat and oxidation, polyolefines, acrylate rubbers and styrene polymers do not confer on the moulding compounds the required high impact strength at low temperatures.

Silicone rubbers are well known for their high impact strength in the cold (DE-OS 25 39 572) but experience has shown that mixtures of fully aromatic polyesters and conventional silicone rubber result in moulded products which have an uneven surface.

Moulding compounds of aromatic polyester carbonates and polycarbonates with high resistance to stress cracking have already been proposed (U.S. Pat. No. 4,579,903). This property may be obtained by the addition of hydrogenated styrene-butadiene copolymers. Such additives may, however, cause problems in the surface such as delamination, and reduce the toughness of the moulding compounds at low temperatures and are therefore unsuitable for certain applications, for example in the external parts of motor vehicles.

It has now surprisingly been found that mixtures of fully aromatic polyesters, vinyl copolymers and special grafted, particulate silicone rubbers can be worked up into moulding compounds which are tough at low temperatures and have good surface qualities and in addition very high resistance to stress cracking.

The invention relates to thermoplastic moulding compounds based on

A. from 5 to 98 parts by weight, preferably from 40 to 95 and especially from 50 to 90 parts by weight of a fully aromatic polyester,
B. from 2 to 80 parts by weight, preferably from 3 to 60 and especially from 4 to 40 parts by weight of a thermoplastic vinyl copolymer of
  B.1 from 50 to 98 parts by weight, preferably from 60 to 95 parts by weight of styrene, α-methylstyrene, styrene which is substituted in the nucleus, methyl methacrylate or mixtures thereof and
  B.2 from 50 to 2 parts by weight, preferably from 40 to 5 parts by weight of acrylonitrile, methacrylonitrile, methyl methacrylate, maleic acid anhydride, N-substituted maleimide or mixtures thereof,
C. from 1 to 95 parts by weight, preferably from 2 to 60, especially from 3 to 40 parts by weight of a graft polymer of
  C.1 from 5 to 90 parts by weight, preferably from 30 to 80 parts by weight of a mixture of
    C.1.1 from 50 to 98 parts by weight, preferably from 60 to 95 parts by weight of styrene α-methylstyrene, styrenes substituted with halogen or methyl in the nucleus, methyl methacrylate or mixtures of these compounds and
    C.1.2 from 2 to 50 parts by weight, preferably from 5 to 40 parts by weight of acrylonitrile, methacrylonitrile, methyl methacrylate, maleic acid anhydride, $C_1$-$C_4$-alkyl-substituted or phenyl-N-substituted maleimides or mixtures of these compounds on
  C.2 from 10 to 95 parts by weight, preferably from 20 to 70 parts by weight of a silicone rubber having an average particle diameter d50 of from 0.09 to 1 μm, preferably from 0.09 to 0.4 μm, and a gel content above 50% by weight, preferably above 70 and especially from 73 to 98% by weight, based on
  C.2, obtainable from
    (a) dihalogenated diorganosilane,
    b) from 0 to 10 mol-%, based on (a), of trihalogenated organosilane,
    (c) from 0 to 3 mol-%, based on (a), of tetrahalogenated silane and
    (d) from 0 to 0.5 mol-%, based on (a), of halogenated triorganosilane, in which the organyl groups of compounds (a), (b) and (d) may be
    (α) $C_1$-$C_6$-alkyl or cyclohexyl, preferably methyl or ethyl,
    (β) $C_6$-$C_{12}$-aryl, preferably phenyl,
    (γ) $C_1$-$C_6$-alkenyl, preferably vinyl or allyl, or
    (δ) mercapto-$C_1$-$C_6$-alkyl, preferably mercaptopropyl, under the condition of the sum of (γ+δ) is from 2 to 10 mol-%, based on all the organyl groups of compounds (a), (b) and (d), and the molar ratio of γ:δ is from (3:1) to (1:3), preferably from (2:1) to (1:2).

Fully aromatic polyesters A for the purpose of this invention include aromatic polyesters and aromatic polyester carbonates synthesized predominantly or exclusively from aromatic $C_8$-$C_{14}$-dicarboxylic acids, $C_6C_{30}$-diphenols and optionally carbonic acid derivatives such as phosgene.

The following are examples of preferred aromatic dicarboxylic acids: Isophthalic acid, terephthalic acid, diphenylether-4,4'-dicarboxylic acid and naphthalene-2,6-dicarboxylic acid. Iso- and terephthalic acid are particularly preferred and phosgene is a preferred carbonic acid derivative.

Preferred diphenols for the preparation of the fully aromatic polyesters A include compounds corresponding to the following formula I:

HO—Z—OH (I), wherein

Z denotes a divalent mononuclear or multinuclear aromatic group containing 6 to 30 carbon atoms and Z has both OH groups directly attached each to a carbon atom of an aromatic system.

Particularly preferred diphenols are compounds corresponding to the following formula II

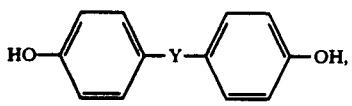

(II)

in which
Y denotes a single bond, an alkylene or alkylidene group with 1 to 7 carbon atoms, a cycloalkylene or cycloalkylidene group with 5 to 12 carbon atoms, O, S,

$SO_2$ or

or derivatives thereof which are alkylated or halogenated in the nucleus.

The following are examples:

Hydroquinone, resorcinol, dihydroxydiphenyls, bis-(hydroxyphenyl)-alkanes, bis-(hydroxyphenyl)-cycloalkanes, bis-hydroxyphenyl)-ethers, bis-(hydroxphehyl)-ketones, bis-(hydroxyphenyl)-sulphoxides, bis-(hydroxyphenyl)-sulphones and/or A,A'-bis-(hydroxyphenyl)-diisopropyl-benzenes and derivatives thereof which are alkylated and/or halogenated in the nucleus.

The following are preferred diphenols: Bisphenol A, tetramethylbisphenol A, 1,1-bis-(4-hydroxyphenyl)-isobutane, 1,1-bis-(4-hydroxyphenyl)-cyclohexane, 4,4'-dihydroxy-diphenylsulphide, 4,4'-dihydroxy-diphenylsulphone and the di- and tetra-halogenated derivatives of these compounds. Bisphenol A is particularly preferred.

Possible branching agents are mentioned in DE-OS 2 940 024 and 3 007 934.

Chain breaking agents used for the aromatic polyesters A are preferably phenol, alkylphenols containing $C_1-C_{12}$-alkyl groups, halogenated phenols, hydroxydiphenyl, naphthols, chlorocarbonic acid esters of such phenolic compounds and chlorides of aromatic monocarboxylic acids optionally substituted with $C_1-C_{22}$-alkyl groups and with halogen atoms. These chain breaking agents are used in quantities of from 0.1 to 10 mol-% (based on diphenols in the case of phenols and on acid dichlorides in the case of acid chlorides). Chlorides of aliphatic monocarboxylic acids containing up to 22 carbon atoms may also be used.

Up to 30 mol-% of the dicarboxylic acids and dihydroxy compounds of aliphatic units, such as adipic acid and butane-1,4-diol, may take part in the synthesis of the aromatic polyesters A.

The fully aromatic polyesters A may also be partly synthesized from aromatic hydroxycarboxylic acids, e.g. p-hydroxybenzoic acid. The proportion of such hydroxycarboxylic acids may be up to 100 mol-% (based on bisphenol).

When iso- and terephthalic acids together take part in the synthesis of the fully aromatic polyesters A, they may be used in proportions of from 1:20 to 20:1.

The fully aromatic polyesters preferably contain up to 99 mol-%, in particular up to 80 mol-%, most preferably up to 50 mol-% of carbonate groups, based on the sum of ester and carbonate groups.

Both the ester component and the carbonate component of the fully aromatic polyester carbonates A may be present in the form of blocks or randomly distributed in the polycondensate.

The carbonate group content may be adjusted to a desired value by mixing fully aromatic polyesters or aromatic polyester carbonates with aromatic polycarbonate.

The preparation of the fully aromatic polyesters A is known in the art and has been described, e.g. in DE-OS 1 495 626, 2 232 877 2 703 376, 3 000 610, 2 714 544, 2 940 024 and 3 007 934. The phase interface process is particularly preferred.

The relative solution viscosity ($\eta_{rel}$) of the fully aromatic polyesters A lies in the range of from 1.18 to 1.4, preferably from 1.22 to 1.3 (determined on solutions of 0.5 g of polyester A in 100 ml of $CH_2Cl_2$ solution at 25° C.).

Preferred vinyl copolymers B are those obtained from at least one monomer selected from styrene, α-methylstyrene and/or styrene substituted in the nucleus and at least one monomer selected from acrylonitrile, methacrylonitrile, methyl methacrylate, maleic acid anhydride and/or N-substituted maleimide.

Copolymers B are frequently formed as by-products of graft polymerisations carried out to prepare component C, especially when large quantities of monomers are grafted on small quantities of rubber.

The quantity of 2 to 80 parts by weight of copolymer B to be used according to the invention, based on 100 parts of A+B+C, does not include these by-products of graft polymerisation.

The copolymers B are resinous, thermoplastic and free from rubber. Copolymers of styrene and maleic acid anhydride with a random structure are particularly preferred copolymers B according to the invention. These may advantageously be prepared from the corresponding monomers by as continuous solvent-free or solution polymerisation not carried to completion.

The proportions of the two components of the randomly structured styrene/maleic acid anhydride copolymers suitable for this invention may vary within wide limits. The maleic acid anhydride content is preferably from 5 to 25% by weight.

Instead of styrene, the polymers may contain styrenes which are substituted in the nucleus, such as p-methylstyrene, vinyl toluene or 2,4-dimethylstyrene, as well as other substituted styrenes, such as α-methylstyrene.

The molecular weights (number average $\overline{M}n$) of the randomly structured styrene/maleic acid anhydride copolymers suitable for use as component B according to the invention may vary over a wide range and are preferably in the range of from 60,000 to 200,000. These products preferably have limiting viscosity number ($\eta$) of from 0.3 to 0.9 (determined in dimethylformamide at 25° C.; see Hoffmann, Krömer, Kuhn, Polymeranalytik I, Stuttgart 1977, page 316 et seq).

Preferred silicone rubbers C.2 are those in which at least 80 mol-% of the organyl groups are methyl groups.

The end group is generally a diorganyl-hydroxylsiloxy unit, preferably a dimethyl-hydroxy-siloxy unit.

Silanes (a) to (d) used for the preparation of the silicone rubbers C.2 preferably contain chlorine as halogen substituent.

"Obtainable" in the context of this invention means that the silicone rubber C.2 need not necessarily be prepared from the halogen compounds (a) to (d). The definition in fact also covers silicone rubbers C.2 of the same structure which have been prepared from silanes containing different hydrolysable groups, such as $C_1$-$C_6$-alkoxy groups, or from cyclic siloxane oligomers.

The silicone rubbers C.2 are in the form of particles.

The average particle diameter $d_{50}$ is the diameter which is smaller than 50% by weight of the particles and larger than the other 50% by weight. It may be determined by ultracentrifuge measurements.

The gel content is determined in acetone at 25° C.

When the graft polymers C are prepared by graft copolymerisation, a certain proportion of free polymers and copolymers of the graft monomers forming the graft shell are generally formed in addition to the graft copolymer proper. Graft polymers C in the context of this invention are therefore products obtained by the polymerisation of graft monomers C.1 in the presence of the silicone rubber C.2, these products strictly speaking being generally a mixture of graft copolymer and free (co)polymer of the graft monomers C.1.

The moulding compounds according to the invention have optimum properties when the quantity of free (co)-polymer does not exceed 50% by weight, preferably not 30% by weight and most preferably not 20% by weight, based on component C.

The graft polymers C may be prepared by radical graft polymerisation, for example by a method analogous to that of DE-PS 24 21 288, e.g. as follows:

A silicone oligomer of silicone rubber C.2 is first prepared by emulsion polymerisation.

The basic method of preparing an emulsion of a long chained OH-terminated silicone oil by emulsion polymerisation is well known to the man of the art; see, for example, U.S. Pat. No. 2,891,910 and GB-PS 102 424. The method disclosed in the said British Specification of using an alkylbenzene sulphonic acid is particularly preferred because emulsifier and polymerisation catalyst are then present as a single compound. The acid is neutralised after polymerisation.

By employing this method, the concentration of emulsifier may be kept low and the finished product obtained after preparation of the emulsion contains very little contamination from the catalyst. n-Alkylsulphonic acids may be used instead of the above-mentioned alkyl benzene sulphonic acids, and coemulsifiers may be used in addition to the catalytically active sulphonic acid.

Such coemulsifiers may be non anionic or anionic. Suitable anionic coemulsifiers include in particular salts of the above-mentioned n-alkyl or alkylbenzene sulphonic acids. Polyoxyethylene derivatives of fatty alcohols and fatty acids are suitable non-ionogenic coemulsifiers. Examples of such emulsifiers include POE (3)-lauryl alcohol, POE (20)-oleyl alcohol, POE (7)-nonylphenol and POE (10)-stearate ("POE (X)-lauryl alcohol" means that X units of ethylene oxide have been added to 1 molecule of lauryl alcohol, where X stands for an average value).

Silicone oils which have been obtained by emulsion polymerisation in the presence of non-ionogenic coemulsifiers generally have a lower molecular weight than those which have been prepared without a coemulsifier. The molecular weight of the OH-terminated silicone oil obtained from emulsion polymerisation may be controlled, for example, by the temperature at which equilibrium is established between siloxane, water and the silane oil initially formed by ring opening of the siloxane (for details concerning the connection between temperature and molecular weight, see the work by D.R. Weyenberg et al, J.Polym.Sci., Part C, 27, pages 28 to 34 (1969)).

Groups γ and δ may be incorporated in the silicone polymer by reacting in the presence of suitable siloxane oligomers. Tetramethyl-tetravinyl-cyclotetrasiloxane and α-mercaptopropyl-methyl-dimethoxysilane and its hydrolysate are examples of suitable starting oligomers.

These functional oligomers are added to the main oligomer, e.g. octamethylcyclotetrasiloxane, in the required quantities.

The incorporation of relatively long chained alkyl groups such as ethyl, propyl or the like and the incorporation of phenyl groups may be achieved by analogous methods.

Sufficient cross-linking of the silicone rubber may be obtained if the groups γ and δ react with each other in the process of emulsion polymerisation so that the addition of an external cross-linking agent may be unnecessary although a silane which has a cross-linking action may be added to increase the degree of cross-linking of the silicone rubber.

Branching and cross-linking may be achieved by the addition of, for example, tetra-ethoxysilane or a silane of the general formula organyl-SiX$_3$ where X is a hydrolysable group, in particular the alkoxy group. Methyl trimethoxysilane and phenyl trimethoxysilane are particularly preferred, apart from tetraethoxysilane.

The graft copolymer C may be prepared by radical graft polymerisation of the graft monomers C.1.1 and C.1.2 in the presence of the silicone rubber, in particular at 40° to 90° C. The graft polymerisation may be carried out in suspension, dispersion or emulsion. Continuous or discontinuous emulsion graft polymerisation is preferred. This graft polymerisation is carried out with the addition of radical initiators (from the group of peroxides, azo compounds, hydroperoxides, persulphates or perphosphates) and optionally in the presence of anionic emulsifiers such as carboxonium salts, sulphonic acid salts or organic sulphates. Graft polymers with high graft yields are obtained under these conditions, i.e. a high proportion of the polymer of the monomers C.1 is chemically bound to the silicone rubber C.2. This special silicone rubber C.2 obviates the need for special measures (for obtaining high graft yields).

Graft polymers C prepared as described above may be worked up by conventional processes such as coagulation of the latices with electrolytes (salts, acids or mixtures thereof) followed by purification and drying.

The moulding compounds according to the invention may contain the usual quantities of other additives commonly used for aromatic polyesters and graft polymers, such as stabilizers, pigments, mould release agents, flame retardants and antistatic agents.

The moulding compounds according to the invention may be prepared by mixing the components together in known manner and melt compounding or melt extruding them at elevated temperatures, preferably at 200° to 350° C., in conventional apparatus such as internal kneaders, extruders or double shaft screws. The individual components may be mixed together successively or simultaneously.

The invention thus also relates to a process for the preparation of the moulding compounds described above by mixing of the components at elevated temperatures.

The moulding compounds according to the invention may be used for the production of moulded articles of all types, e.g. by injection moulding. The following are examples of such moulded articles: Parts of housings (e.g. for domestic appliances such as juice extractors, coffee machines, mixers), access panels for the building industry, and parts of motor vehicles. They are also used for electrical appliances such as strips of plug sockets on account of their excellent electrical properties.

Moulded products may also be obtained by deep drawing previously produced boards or sheets.

The invention also relates to the use of the moulding compounds described above for the production of moulded articles.

Examples

The parts indicated are parts by weight.

A. Fully aromatic polyester carbonate

A1

Polyester carbonate with an ester content of 50 mol-% based on bisphenol A and isophthalic and terephthalic acid (1:1) containing 3 mol-%, based on the bisphenol A units, of p-isooctylphenyl end groups, and having a relative viscosity $\eta_{rel}$ of 1.30 (determined on a solution of 0.5 g of polyester carbonate in 100 ml of $CH_2Cl_2$ at 25° C.).

A2

Linear polycarbonate based on bisphenol A and having a relative solution viscosity $\eta_{rel}$ of from 1.26 to 1.28 determined in $CH_2Cl_2$ at 25° C. and at a concentration of 0.5 g/100 ml.

B. Styrene/maleic acid anhydride copolymer

B1

Styrene/maleic acid anhydride copolymer having a maleic acid anhydride content of 8% produced by Arco Polymers, Inc. (Dylark 232) and having a L-value of 1.7 g/10 min and a number average molecular weight of 135,000 g/mol.

B2

Styrene/acrylonitrile copolymer having a styrene/acrylonitrile ratio of 72:28 and a limiting viscosity of $(\eta)=0.55$ dl/g (determined in dimethylformamide at 20° C.).

C. Graft polymer

1. Preparation of silicone rubber emulsion (C.2) 38.4 Parts of octamethylcyclotetrasiloxane, 1.2 parts of tetramethyl tetravinyl cyclotetrasiloxane and 1 part of α-mercaptopropyl methyldimethoxysilane are stirred together. 0.5 Parts of dodecylbenzene sulphonic acid are added and 58.4 parts of water are then added in the course of one hour with vigorous stirring. The pre-emulsion is homogenised twice at 200 bar in a high pressure emulsifying machine. A further 0.5 parts of dodecylbenzene sulphonic acid is added. The emulsion is stirred for 2 hours at 85° C. and then for 36 hours at 20° C. and neutralised with 5N NaOH. A stable emulsion having a solids content of about 36% by weight is obtained. The polymer has a gel content of 82% by weight, determined in toluene. The average particle size is 300 nm. 2. Preparation of graft polymers C 2107 parts of latex C.2 and 1073 parts of water are introduced into a reactor.

After this reaction mixture has been initiated with a solution of 7.5 parts of potassium peroxydisulphate in 195 parts of water at 65° C., the following solutions are introduced into the reactor at a uniform rate within 4 hours:

Solution 1: 540 parts of styrene and 210 parts of acrylonitrile;

Solution 2: 375 parts of water and 15 parts of the sodium salt of $C_{14}$–$C_{18}$-alkyl sulphonic acids.

Polymerisation is then carried out at 65° C. and completed within 6 hours. A latex having a solids content of about 33% by weight is obtained.

After coagulation with an aqueous magnesium chloride/acetic acid solution, filtration and drying in a vacuum, the graft polymer is obtained in the form of a white powder.

Preparation and testing of the moulding compounds according to the invention

Components A, B and C were melted and homogenised in a continuously operating double shaft extruder (reaction temperature 280° C). The molten strand was degasified before its exit from the die and granulated and dried.

Rods measuring 80×10×4 mm were produced from the moulding compounds in an injection moulding machine (operating temperature: 280° C.) and used to determine the notched impact strength (according to method ISO 180) at room temperature, $-20°$ C., $-40°$ C. and $-60°$ C.

The transition from tough to brittle was thereby determined, i.e. the temperature range in which the first breakages due to brittleness occur.

Stress cracking was investigated according to DIN 53 449/3 on proportional rods 0.7 at a reaction temperature of 280° C. A mixture of 50% toluene and 50% over a template in the form of a circular arc and stored in the simulated fuel for 5 minutes at 23° C. The amount of prestretching $\epsilon_x$ ranged from 0.4 to 2.4%. Stress cracking was assessed by the formation of cracks or breakages in dependence upon the amount of preliminary stretching.

As shown in the following Table, moulding compounds obtained according to the invention (Examples 3 and 4) have greater toughness at low temperature and substantially greater resistance to stress cracking than comparison Examples 1 and 2 which have the same polyester carbonates and rubber content. All the moulded articles according to the invention have completely uniform surfaces. When the combination of styrene/maleic acid anhydride copolymers and special silicone graft rubbers (Example 4) is used, which is particularly preferred according to the invention, the moulding compounds obtained have exceptionally high resistance to stress cracking.

TABLE 1

| Example | A1 (% by wt.) | A2 (% by wt.) | B1 (% by wt.) | B2 (% by wt.) | C (% by wt.) | C* (% by wt.) | Tough-brittle transition (°C.) | Breakage at $c_x$ (%) |
|---|---|---|---|---|---|---|---|---|
| 1 (Comparison) | 60 | 15 | — | 10 | — | 15 | −20/−30 | 0.4 |

TABLE 1-continued

| Example | A1 (% by wt.) | A2 (% by wt.) | B1 (% by wt.) | B2 (% by wt.) | C (% by wt.) | C* (% by wt.) | Tough-brittle transition (°C.) | Breakage at $c_x$ (%) |
|---|---|---|---|---|---|---|---|---|
| 2 (Comparison) | 60 | 15 | 10 | — | — | 15 | −20/−30 | 0.4 |
| 3 | 60 | 15 | — | 10 | 15 | — | <−60 | 1.0 |
| 4 | 60 | 15 | 10 | — | 15 | — | −40/−50 | 2.4 |

C* Graft polymer of 50 parts by weight of a copolymer of styrene and acrylonitrile in proportions of 72:28 on 50 parts by weight of particulate polybutadiene rubber (particle size $d_{50}$: 0.4 μm) prepared by emulsion polymerisation.

We claim:

1. Thermoplastic moulding compositions comprising
A. from 5 to 98 parts by weight of fully aromatic polyester synthesized from aromatic $C_8$–$C_{14}$ dicarboxylic acids and $C_6$–$C_{30}$ diphenols or aromatic polyester carbonate synthesized from aromatic $C_8$–$C_{14}$ dicarboxylic acids, $C_6$–$C_{30}$ diphenols and phosgene,
B. from 2 to 80 parts by weight of a thermoplastic vinyl polymer of
B.1 from 50 to 98 parts by weight of styrene, α-methylstyrene, vinyl toluene, 2,4-dimethyl styrene, methyl methacrylate or mixtures thereof and
B.2 from 50 to 2 parts by weight of acrylonitrile, methacrylonitrile, methyl methacrylate, maleic acid anhydride, N-substituted maleimide or mixtures thereof, and
C. from 1 to 95 parts by weight of a graft polymer of
C.1 from 5 to 90 parts by weight of a monomer mixture of
C.1.1 from 50 to 98 parts by weight of styrene, α-methylstyrene, styrene substituted by halogen, vinyl toluene, 2,4-dimethyl styrene, methyl methacrylate or mixtures of these compounds and
C.1.2 from 2 to 50 parts by weight of acrylonitrile, methacrylonitrile, methyl methacrylate, maleic acid anhydride, $C_1$–$C_4$-alkyl- or phenyl-N-substituted maleimide or mixtures of these compounds, grafted onto a substrate consisting of
C.2 from 10 to 95 parts by weight of silicone rubber having an average particle diameter of $d_{50}$ of from 0.09 to 1 microns and a gel content of more than 50 percent by weight, based on C.2, derived from
(a) dihalogenated diorganosilane,
(b) from 0 to 10 mol-%, based on (a), of trihalogenated organosilane,
(c) from 0 to 3 mol-%, based on (a), of tetrahalogenated silane and
(d) from 0 to 0.5%, based on (a) of halogenated triorganosilane, in which the organyl groups of compounds (a), (b) and (d) is
(α) $C_1$–$C_6$-alkyl or cyclohexyl,
(β) $C_6$–$C_{12}$-aryl,
(γ) $C_1$–$C_6$-alkenyl and/or
(δ) mercapto-$C_1$–$C_6$-alkyl,
under the condition that the sum of (γ+δ) is from 2 to 10 mol-%. based on all the organyl groups of compounds (a), (b) and (d), and the molar ration γ:δ is from (3:1) to (1:3).

2. Moulding compositions according to claim 1 based on 40 to 95 parts by weight of component A, 3 to 60 parts by weight of component B and 2 to 60 parts by weight of component C.

3. Moulding compositions according to claim 1 based on 50 to 90 parts by weight of component A, 4 to 40 parts by weight of component B and 3 to 40 parts by weight of component C.

4. Moulding compositions according to claim 1 characterised in that graft polymer C is prepared from 30 to 80 parts by weight of a graft monomer C.1 and 20 to 70 parts by weight of a silicone rubber C. 2.

5. Moulding compositions according to claim 1 characterised in that the particle diameter $d_{50}$ of the silicone rubber C.2 is from 0.09 to 0.4 μm.

6. Moulding compositions according to claim 1 characterized in that the gel content of the silicone rubber C.2 is above 70% by weight.

7. Moulding compositions according to claim 1 characterised in that the gel content of the silicone rubber C.2 is from 73 to 98% by weight.

8. Moulding compositions according to claim 1 characterised in that at least 80 mol-% of the organyl groups of components (a), (b), (d) are methyl groups, the groups γ are vinyl and/or allyl groups and the groups δ are mercaptopropyl groups.

9. Moulding compositions according to claim 1 characterized in that they additionally contain at least one stabilizer, pigment, mould release agent, flame retardant or antistatic agent.

* * * * *